(12) United States Patent
Pauplis et al.

(10) Patent No.: US 7,317,427 B2
(45) Date of Patent: Jan. 8, 2008

(54) ADAPTIVE ARRAY

(75) Inventors: Barbara E. Pauplis, Carlisle, MA (US); Edward A. Seghezzi, Londonderry, NH (US); W. Timothy Carey, Cambridge, MA (US)

(73) Assignee: Raytheon Company, Waltham, MA (US)

( * ) Notice: Subject to any disclaimer, the term of this patent is extended or adjusted under 35 U.S.C. 154(b) by 458 days.

(21) Appl. No.: 11/042,878

(22) Filed: Jan. 25, 2005

(65) Prior Publication Data

US 2006/0164284 A1 Jul. 27, 2006

(51) Int. Cl.
H01Q 21/00 (2006.01)

(52) U.S. Cl. .............................. 343/853; 343/700 MS; 342/16; 342/17; 342/372

(58) Field of Classification Search .................. 342/16, 342/362, 372, 373, 17; 343/700 MS, 853
See application file for complete search history.

(56) References Cited

U.S. PATENT DOCUMENTS

| | | | | |
|---|---|---|---|---|
| 4,052,723 A * | 10/1977 | Miller | ........................ | 342/379 |
| 4,642,645 A | 2/1987 | Haupt | | |
| 5,017,928 A | 5/1991 | Haupt et al. | | |
| 6,031,485 A * | 2/2000 | Cellai et al. | ................. | 342/131 |
| 6,084,540 A * | 7/2000 | Yu | .............................. | 342/17 |
| 6,124,828 A * | 9/2000 | Champeau | .................. | 342/379 |
| 6,618,007 B1 * | 9/2003 | Miller | ........................ | 342/375 |
| 6,653,973 B2 | 11/2003 | Yu | | |
| 6,759,980 B2 * | 7/2004 | Chen et al. | ................. | 342/372 |

FOREIGN PATENT DOCUMENTS

EP 1 385 019 1/2004

EP 1 385 019 A1 1/2004

OTHER PUBLICATIONS

Mitchell et al.; "Adaptive Digital Beamforming (ADBF) Architecture for Wideband Phased Array Radars;" GTRI Journal of Technology; XP-002238510; Aug. 1999, 11 sheets.
Goffer et al.; "Design of Phased Arrays in Terms of Random Subarrays;" 8082 IEEE Transactions on Antennas and Propagation, vol. 42, No. 6; Jun. 1994; pp. 820-826.
PCT Search Report and Written Opinion of the ISA for PCT/US2005/045095 dated Jul. 13, 2006.
Nickel: "A Corrected Monopulse Estimation Method for Adaptive Arrays;" Radar 92: Proceedings of the International Conference, Brighton, United Kingdon; Oct. 12-13, 1992; pp. 324-327.
Nickel: "Subarray Configurations for Digital Beamforming with Low Sidelobes and Adaptive Interference Supression;" IEEE International Radar Conference; May 1995; 0-7803-2120-0-95/0000-0714: pp.714-719.
Nickel: "Monopulse Estimation with Subarray-Adaptive Arrays and Artibrary Sum and Difference Beams;" IEEE Proc.-Radar, Sonar Navig; vol. 143, No. 4; Aug. 1996; pp. 232-238.

* cited by examiner

*Primary Examiner*—Tho Phan
(74) *Attorney, Agent, or Firm*—Daly, Crowley, Mofford & Durkee, LLP

(57) ABSTRACT

An adaptive antenna array has array elements arranged in element rows and element columns and subarrays arranged in subarray rows and subarray columns, for which the subarray phase centers have non-uniform spacing. The adaptive antenna array provides good detection and tracking performance when used in a radar system, while being inexpensive and easy to manufacture. A radar system and a method of adapting a radar array both employ the above described adaptive antenna array.

33 Claims, 13 Drawing Sheets

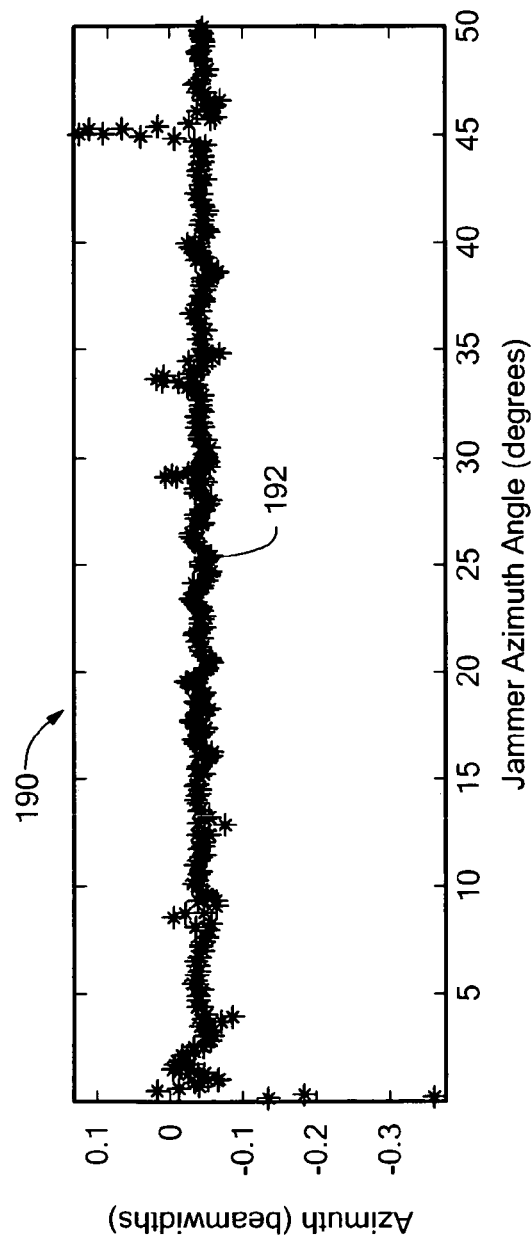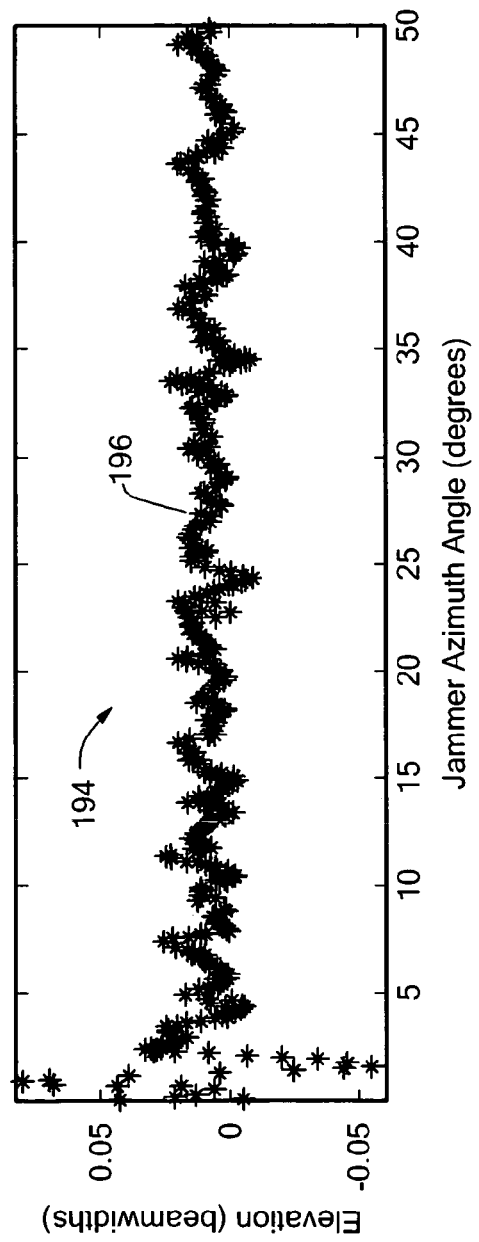
FIG. 4B
FIG. 4C

ADAPTIVE ARRAY

STATEMENT REGARDING FEDERALLY SPONSORED RESEARCH

This invention was made with government support under Contract No. DASG60-98-C-0001 awarded by the United States ARMY. The government has certain rights in the invention.

CROSS REFERENCE TO RELATED APPLICATIONS

Not Applicable.

FIELD OF THE INVENTION

This invention relates generally to radar arrays, and more particularly, to adaptive radar arrays.

BACKGROUND OF THE INVENTION

As is known, jammers emitting radar energy can degrade target detection and tracking performance of radar systems. The jammers can either be active jammers having the purpose of degrading radar performance, as in a battlefield, or the jammers can be non-combative radar emitters, for example, an aircraft in the vicinity of the radar system that has an on-board active radar system.

Adaptive radar arrays are used in conjunction with adaptive beamforming within radar systems to reduce the impact of jammers on radar system detection and tracking performance. A conventional radar array, also referred to herein as a radar antenna, can have thousands of individual transceiver elements, each capable of transmitting and receiving radar energy with a generally omnidirectional spatial pattern. The elements are combined, either in a transmit mode or in a receive mode or both, resulting in one or more transmit radar beams and one or more receive radar beams having spatial directivity. The receive radar beams and the transmit radar beams can be the same or different. In the receive mode, it is often desirable to adaptively change the resulting receive beampattern in response to a jammer, for example, by pointing a beampattern null at the jammer, in order to reduce the affect of the jammer on the radar system detection and tracking performance.

In order to form a receive mode radar beam, often the elements of a radar array are divided into subarrays, each corresponding to a subset of the total number of array elements. Within each subarray, subarray elements can be statically combined to provide subarray beampatterns (with a desired pointing direction for that dwell) having a static geometry. Outputs of the subarrays, i.e., the subarray beampatterns, can be dynamically combined to generate a receive beam that can be dynamically modified, for example, having a main beam directed toward a target of interest while reducing sidelobe levels in a direction of a noise source.

The dynamic combining of the subarray outputs is often performed digitally, wherein the outputs of subarrays are digitized and complex adaptive weighting factors are applied. In this way, the receive beam can be adapted in direction and in shape, including receive beam nulls that can also be adapted in direction and shape, by way of complex adaptive weighting factors applied to the outputs of the subarrays in the combining process.

Radar systems are known that can determine range and bearing of a target from each individual transmitted and received radar pulse. Angle estimation techniques (bearing) can include monopulse measurements and various most likely angle estimators. Many conventional radar systems simultaneously form a plurality of receive beams, and in particular, a monopulse radar simultaneously receives a "sum" beam and one or more "difference" beams in receive mode. The sum beam will be understood to be a radar beam having a maximum response axis generally in a direction of a target. The difference beam will be understood to be a beam having a null generally in the direction of the target. As described above, a direction of the maximum response axis of the sum beam and a direction of the null of the difference beam can be influenced by complex adaptive weighing factors applied to the digitized outputs of the subarrays. Likewise, for a most likely angle estimator, the complex adaptive weighting factors are used to modify the effective receive beam shape to maximize energy received from the target and minimize energy received from noise sources.

When adapting a receive beampattern, it is known that grating lobes and grating nulls can be generated along with a desired receive beam. Grating lobes tend to degrade radar system detection and tracking performance. It is known that grating lobes and grating nulls are influenced by a variety of factors, including, but not limited to, array element relative spacings and positions within each subarray and subarray relative spacings and positions. It is also known that the affect of grating lobes and grating nulls can be reduced by use of irregularly shaped subarrays and irregular subarray relative spacings.

Referring to FIG. 1, a conventional adaptive radar array 10 is described by Nickel, U., *A Corrected Monopulse Estimation Method for Adaptive Arrays*, IEEE International Conference on Radar, page 327, FIG. 5, Brighton, 1992.

The adaptive array 10 has elements identified as solid triangles, which are grouped as subarrays identified as polygons. Each subarray has a different shape, number of elements, and position on the plane of the radar array.

Taking subarray 12 as representative of the other subarrays, (though the other subarrays have different shapes, numbers of elements, and element positions), the subarray 12 has a plurality of elements, for example element 14, and a resulting phase center 16. Each one of the subarrays has a respective phase center, and the plurality of phase centers can be irregularly spaced.

It will be appreciated that the non-symmetrical geometry of the adaptive radar array 10 results in an expensive radar array. Each subarray, having a different geometry, is associated with combining circuitry that performs a static combination of respective subarray elements. The combining circuitry, therefore, can be physically different for each subarray. Thus, a variety of versions of combining circuitry must be designed, built, and maintained for the adaptive radar array 10, resulting in a adaptive array that is costly and difficult to manufacture.

The adaptive radar array 10 has a geometry representative of but one of a variety of conventional adaptive radar arrays. However, each conventional adaptive radar array geometry has a configuration with few or no repetitive geometrical characteristics, and therefore, suffers from the same cost and manufacturing disadvantages.

SUMMARY OF THE INVENTION

In accordance with the present invention, an adaptive antenna array includes a plurality of subarrays, each one of the plurality of subarrays comprised of elements. The elements of the plurality of subarrays are arranged in element rows and element columns, and the plurality of subarrays are arranged in subarray rows and subarray columns. Some of the subarray rows have a different number of element rows than others of the subarray rows. Alternatively or in addition, some of the subarray columns have a different number of element columns than others of the subarray columns. Each of the plurality of subarrays has a respective phase center forming a plurality of phase centers at different phase center positions substantially on a plane. The different phase center positions are non-uniformly spaced from each other along at least one principal dimension in the plane. With this particular arrangement, the adaptive antenna array can be used to provide good detection and tracking performance while being inexpensive and easy to manufacture.

In accordance with another aspect the present invention, a radar system includes an adaptive array as described above. With this particular arrangement, the radar system has an adaptive antenna array that can be used to provide good detection and tracking performance, and provides an antenna array that is inexpensive an easy to manufacture.

In accordance with yet another aspect of the present invention, a method of adapting a radar array includes generating complex adaptive weights associated with the radar array, and applying the complex adaptive weights to the radar array. With this particular arrangement, the method makes use of an adaptive antenna array that can be used to provide good detection and tracking performance, the antenna array being inexpensive an easy to manufacture.

BRIEF DESCRIPTION OF THE DRAWINGS

The foregoing features of the invention, as well as the invention itself may be more fully understood from the following detailed description of the drawings, in which:

FIG. 4B is a graph of target angle error in azimuth associated with an array geometry as in Case 1 of FIG. 3;

FIG. 4C is a graph of target angle error in elevation associated with an array geometry as in Case 1 of FIG. 3;

DETAILED DESCRIPTION OF THE INVENTION

Before describing the adaptive array of the present invention, some introductory concepts and terminology are explained. As used herein, the terms "element row" and "element column" refer to a row and a column, respectively, associated with antenna array elements upon which one or more of the array elements are disposed. As used herein, the terms "subarray row" and "subarray column" refers to a row and column, respectively, associated with antenna array subarrays upon which one or more of the subarrays are disposed.

Figure 1:
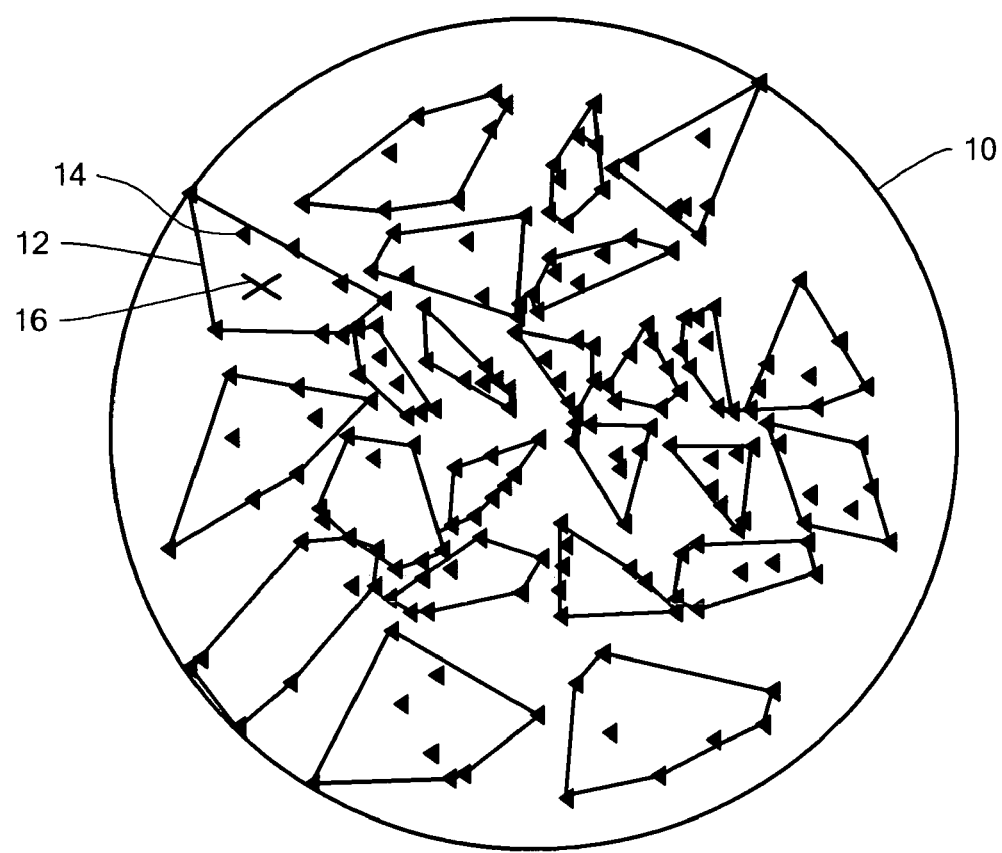
FIG. 1 is a diagram of an exemplary prior art adaptive array antenna arrangement.
Figure 2:
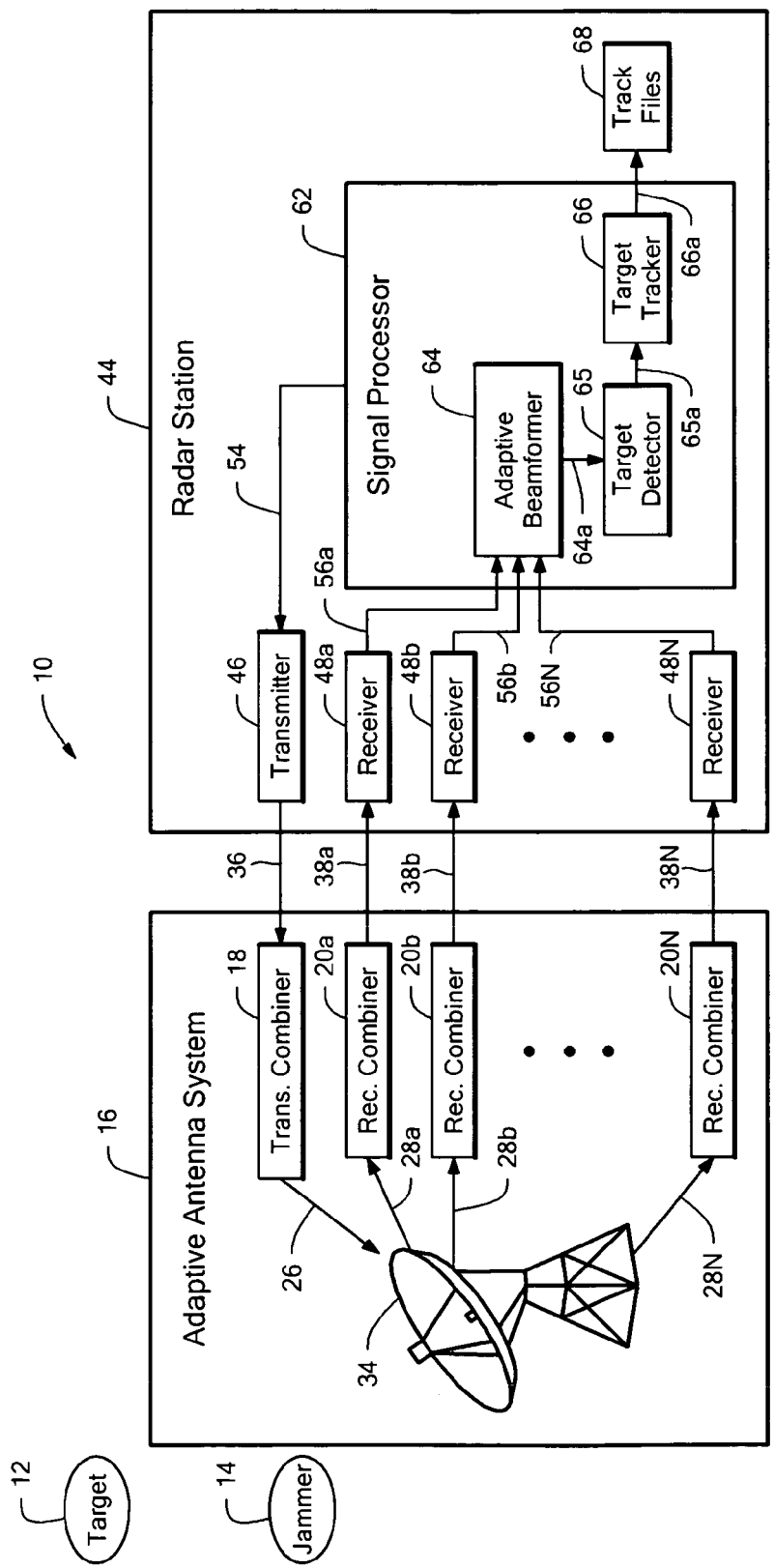
FIG. 2 is a block diagram of an adaptive radar system having an adaptive array.

Referring to FIG. 2, an adaptive radar system 10 can be used in the presence of one or more targets, e.g., target 12, and one or more jammers, e.g., jammer 14. The adaptive radar system 10 includes an adaptive antenna system 16 coupled to a radar station 44. The adaptive antenna system 16 includes an adaptive antenna array 34 having subarrays (not shown). Each of the subarrays has elements (not shown) providing element outputs, for example, element outputs 28a-28N, each having a respective plurality of element outputs, that are statically combined by a receive combiner circuit, for example receive combiner circuits 20a-20N, respectively, to provide respective beamformed subarray output signals, for example, beamformed subarray output signals 38a-38N, having statically beamformed characteristics. The antenna array 34 and beamformed subarray output signals 38a-38N having the static beamformed characteristics are described more fully in figures below.

In one particular embodiment, each of the receive combiner circuits 20a-20N is a separate circuit board. While three receiver combiner circuits 20a-20N are shown, associated with three subarrays (not shown), it should be understood that more than three subarrays and more than three associated receive combiner circuits can be provided. Each of the receive combiner circuits 20a-20N can be the same or they can be different, depending upon the form of the subarray to which they are coupled. The antenna array 34 also transmits signals 26 provided to selected ones of the array elements via a transmit combiner circuit 18. In general, the transmit combiner circuit 18 is different from the receive combiner circuits 20a-20N in that the transmit combiner circuit 18 operates in conjunction with one selected set of array elements symmetrically disposed about the antenna array 34, for example, all of the array elements, while each of the receive combiner circuits 20a-20N operates in conjunction with a different subarray having array elements. Each subarray has a different phase center at a different position.

The beamformed subarray output signals 38a-38N are coupled to receivers to amplify and downconvert the beamformed subarray output signals 38a-38N to lower frequency received signals 56a-56N. A signal processor 62 includes an adaptive beamformer circuit 64 that digitizes the lower frequency received signals 56a-56N and performs adaptive beamforming. The adaptive beamforming applies complex adaptive weighting factors to the lower frequency received signals 56a-56N and combines them to generate adaptive receive beam signals 64a having receive beam adaptive characteristics.

The signal processor 62 also includes a target detector 65 to detect targets and to compute target locations using the adaptive receive beam signals 64a and provides target detection data 65a to a target tracker 66, which provides track update information 66a to track files 68. The track files 68 are provided to a radar system operator.

The target tracker 65 can also provide a transmit signal direction 54 to a transmitter 46. An amplified signal 36 is provided to the transmit combiner circuit 18.

Figure 3:
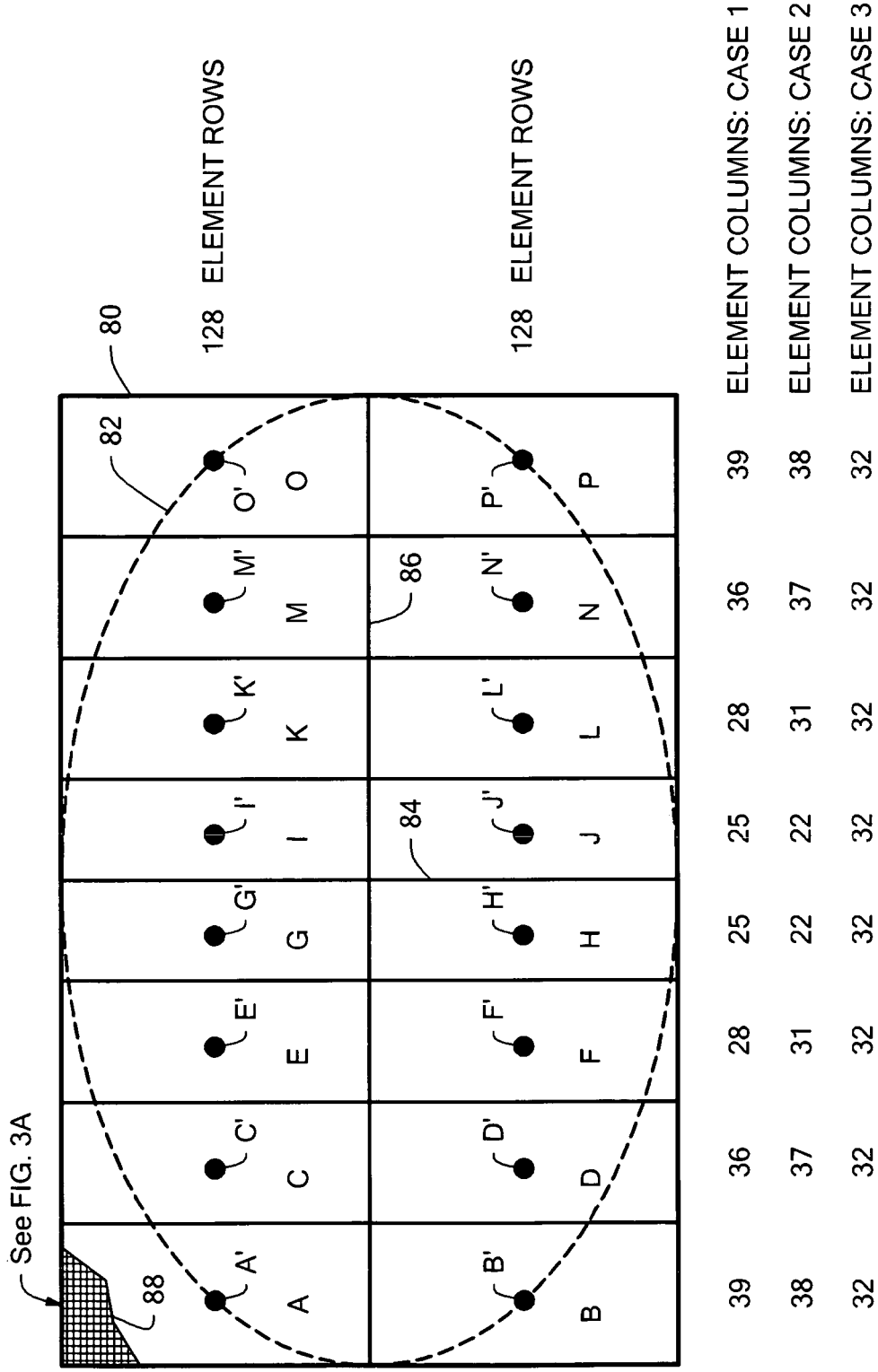
FIG. 3 is a diagram of an adaptive array having subarray rows and subarray columns.

Referring now to FIG. 3, embodiments of the adaptive antenna array each include sixteen subarrays identified as subarrays A-P. Each subarray A-P can be characterized as having a number of element rows, a number of element columns as identified, and a respective phase center A'-P'. Three cases, identified as Cases 1-3, are indicative of alternate embodiments of the present invention, each having a different number of element columns in respective subarrays. In these particular three embodiments, each subarray has the same number of element rows, one hundred twenty eight element rows.

In Case 1, subarrays A, B, O, and P have thirty-nine element columns, subarrays C, D, M, and N have thirty-six element columns, subarrays E, F, K, and L have twenty-eight element columns, and subarrays G, H, I, and J have twenty-five element columns. In an alternate embodiment identified as Case 2, subarrays A, B, O, and P have thirty-eight element columns, subarrays C, D, M, and N have thirty-seven element columns, subarrays E, F, K, and L have thirty-one element columns, and subarrays G, H, I, and J have twenty-two element columns. In yet another alternate embodiment identified as Case 3, each of the subarrays A-P has 32 elements columns. In the embodiments of Cases 1 and 2, it should be appreciated that the phase centers A'-P' tend not to be regularly spaced along the axis 86 and the number of element columns is relatively prime, i.e. have no common factors, while in the embodiment of Case 3, the phase centers A'-P' tend to be regularly spaced and each subarray has the same number of element columns.

While the antenna arrays identified as Cases 1-3 above have subarrays arranged as shown, a preferred antenna array can be more generally characterized in the following way. The preferred antenna array has a plurality of subarrays, wherein the elements of the plurality of subarrays are arranged in element rows and element columns, and wherein the plurality of subarrays are arranged in subarray rows and subarray columns. Some of the subarray rows have a different number of element rows than other ones of the subarray rows. Alternatively, or in addition, some of the subarray columns have a different number of element columns than other ones of the subarray columns. Each of the plurality of subarrays has a respective phase center forming a plurality of phase centers at different phase center positions substantially on a plane. The different phase center positions are non-uniformly spaced from each other along at least one principal dimension in the plane. Furthermore, for all of the plurality of subarrays, each one of the plurality of subarrays in a respective subarray column has the same number of element columns and each one of the plurality of subarrays in a respective subarray row has the same number of element rows.

In one particular embodiment, each of the subarrays is a rectangular subarray as shown. However, in other embodiments, a shape of each of the subarrays is selected in accordance with an elliptical array aperture, as typified by an ellipse 82. In the case of the elliptical array aperture, a boundary of each of the subarrays A-P is formed in accordance with the elliptical shape 82 and the phase centers of each of the subarrays A-P move accordingly to other positions than those shown.

In one particular embodiment, numbers of element columns in selected subarrays in a subarray row are relatively prime, having no common factors, as shown in Cases 1 and 2. In another particular embodiment, numbers of element rows in selected subarrays in a subarray column are relatively prime, for example, as would be the case if the antenna array of FIG. 3 were rotated by ninety degrees. In another particular embodiment both numbers of element columns in selected subarrays in a subarray row are relatively prime and numbers of element rows in selected subarrays in a subarray column are relatively prime. In one particular embodiment, the number of element columns is in each subarray is symmetrical about an axis, for example the axis 84, and the number of element rows in each subarray is symmetrical about another axis, for example, the axis 86.

The radar array identified as Case 3 is described here merely to give a comparison. It will be understood that the exemplary antenna arrays identified as Cases 1 and 2 meet the above description, while the antenna array identified as Case 3 does not. In particular, as described above, the phase centers provided by the subarrays of Case 3 tend to be regularly spaced, unlike the phase centers provided by Cases 1 and 2. Also, Case 3 has subarrays with numbers of element columns that are not relatively prime. It will become apparent from discussion below that performance of the antenna arrays identified as Cases 1 and 2 is substantially better than the antenna array identified as Case 3, in the presence of jammers.

Array elements of each subarray of the antenna arrays identified as Cases 1-3 can be arranged on a grid, for example a triangular grid. The grid is typified by a grid 88, showing but a portion of a total grid. The triangular grid is described more fully in conjunction with FIG. 3A. However, in other embodiments the array elements of each subarray of an antenna array more generally identified by the description above can be arranged on any sort of grid, including, but not limited to, a fully populated rectangular gird, a fully populated triangular grid (see FIG. 3A), a partially populated rectangular grid, a partially populated triangular grid, a sparsely populated rectangular grid, and a sparsely populated triangular grid, or any grid where there exist two vectors which create a lattice and elements are located at all or some of the lattice points.

It should be apparent from discussion above, that while antenna arrays having particular numbers of element columns and element rows are shown, in other embodiment, antenna arrays can have other numbers of element columns and/or other numbers of element rows, so long as the resulting phase centers of the subarrays are not uniformly spaced along at least one axis, and preferably, along two axes. The rectangular subarrays are made up of element columns and element rows. In some embodiments, the number of element columns in selected subarrays in a subarray row are relatively prime and/or the number of element rows in selected subarrays in a subarray column are relatively prime.

Figure 3A:
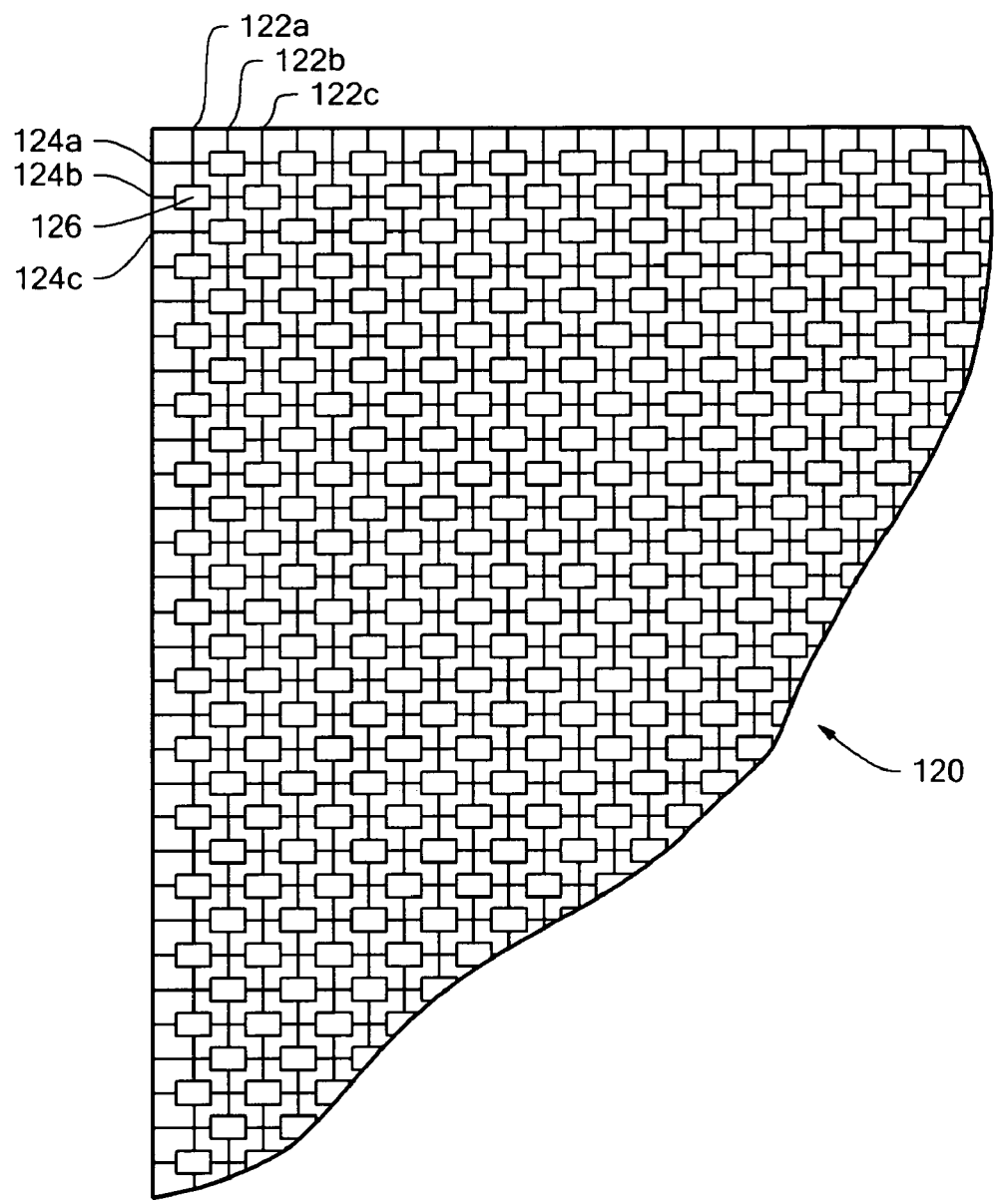
FIG. 3A is a diagram of a portion of the adaptive array of FIG. 3, the portion having element rows and element columns.

Referring now to FIG. 3A, a substantially triangular grid 120 has a plurality of array elements, of which array element 126 is typical of other ones of the plurality of array elements. The array elements are arranged on a plurality of element rows, of which element rows 124a-124c are typical of other element rows and a plurality of element columns, of which element columns 122a-122c are typical of other element columns.

For a triangular grid, array elements are not disposed at intersections of every element row with every element column. For a rectangular grid (not shown), however, array elements are disposed at intersections of every element row with every element column.

As described in conjunction with FIG. 3, the adaptive array of the present invention is not limited to array elements arranged on any particular type of grid. Instead, the array is characterized by relative positions of phase centers associated with subarrays and the sizes of the subarrays. In other embodiments, the array elements of each subarray of an antenna array more generally identified by the description above can be on any sort of grid, including, but not limited to, a fully populated rectangular gird, a fully populated triangular grid (see FIG. 3A), a partially populated rectangular grid, a partially populated triangular grid, a sparsely populated rectangular grid, and a sparsely populated triangular grid, or any grid where there exist two vectors which create a lattice and elements are located at all or some of the lattice points.

Figure 4:
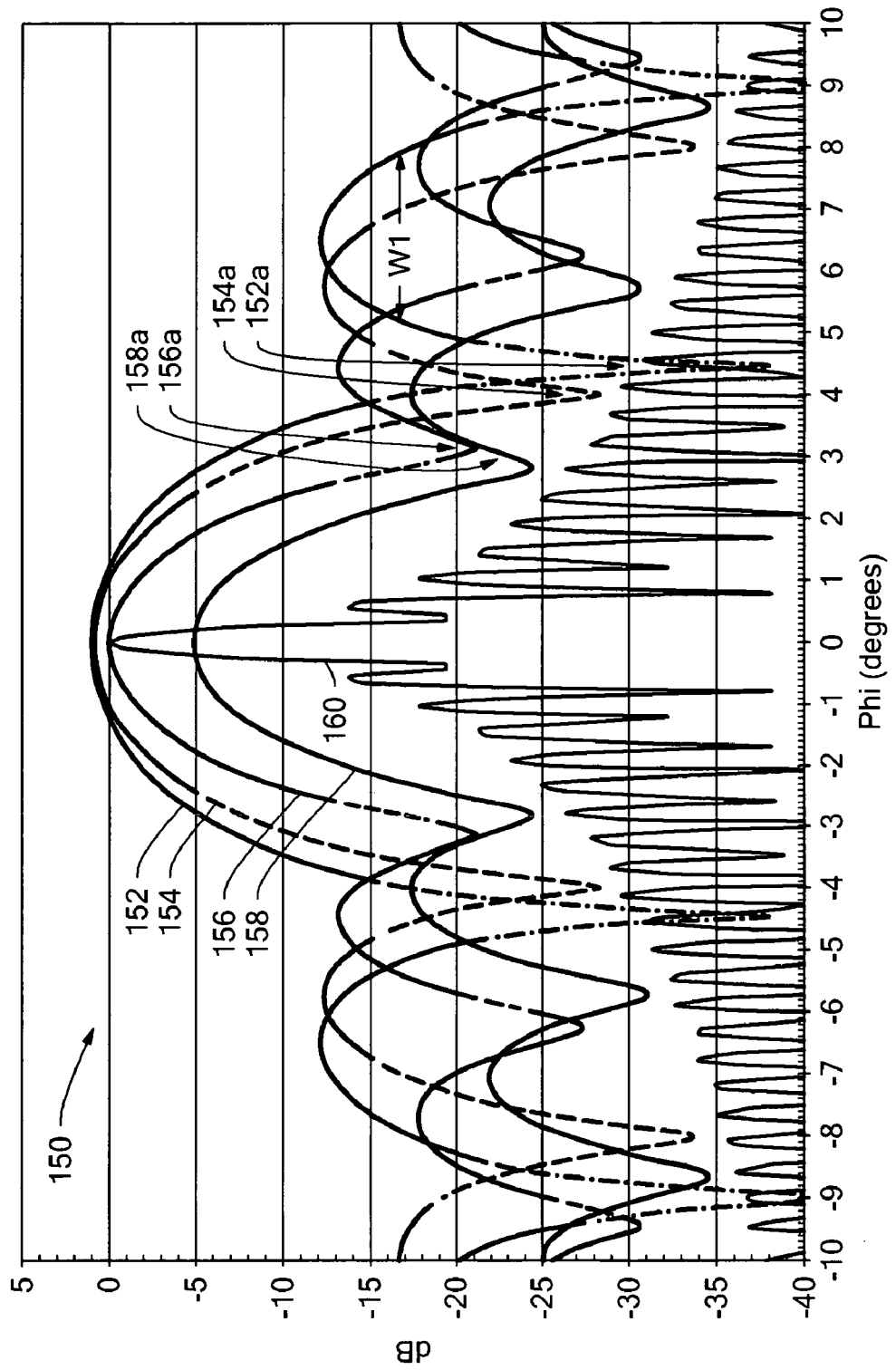
FIG. 4 is a graph showing beampatterns of subarrays corresponding to an array geometry as in Case 1 of FIG. 3.

Referring now to FIG. 4, a graph 150 includes a horizontal scale representing angle in units of degrees and a vertical scale representing power in units of decibels. Curves 152-158 correspond to azimuth subarray beampatterns of the radar array identified as Case 1 in FIG. 3 when used in a receive mode.

A first curve 158 correspond to simulated subarray beampatterns of each of the subarrays A, B, O, and P of FIG. 3, each having thirty-nine element columns corresponding to Case 1, when combined, for example, by one of the receive combiner circuits 20a-20N of FIG. 3. A second curve 156 corresponds to simulated subarray beampatterns of each of the subarrays C, D, M, and N of FIG. 3, each having thirty-six element columns corresponding to Case 1. A third curve 154 corresponds to simulated subarray beampatterns of each of the subarrays E, F, K, and L of FIG. 3, each having twenty-five element columns corresponding to Case 1. A fourth curve 152 corresponds to simulated subarray beampatterns of each of the subarrays G, H, I, J of FIG. 3 having twenty-five element columns corresponding to Case 1. It will be understood that the curves 152-158 each correspond to four beampatterns, though only one is shown for clarity. For this example, a linear Taylor illumination, which would produce a −30 dB peak sidelobe level, was applied across the entire aperture of the array in the azimuth direction. A uniform illumination function was applied in the elevation direction. The subarray combining weights and the static subarray beamformer design together create an azimuth taper.

As described above, the receive beampatterns 152-158 are statically generated, for example by the receive combiner circuits 20a-20N (FIG. 2). The receive beampatterns 152-158 are combined, for example with the adaptive beamformer 64 of FIG. 2, using complex adaptive weights, to provide an adaptive receive beam pattern (not shown) pointed in the desired direction, for example, toward a target, with nulls pointed at jammer locations.

A fifth curve 160 corresponds to a beampattern of the entire radar array identified as Case 1 in FIG. 3 when used in a transmit mode. As shown in FIG. 2, in the transmit mode, array elements are combined with the transmit combiner circuit 18 different than receive combiner circuits 20a-20N. In this case, all elements of the radar array identified as Case 1 in FIG. 3 are uniformly combined and uniformly illuminated.

It can be seen that beampattern nulls, for example beampattern nulls 152a-158a, corresponding to subarray beampatterns 152-158, respectively, occur at different angles and the different angles are relatively spaced by at least one quarter of a width of a sidelobe, one quarter of a width $w_1$, of any of the subarray beampattern sidelobes. Sidelobe width (and main lobe beamwidth) as used herein, is the width at points on the sidelobe (or main lobe) that are reduced in amplitude by three dB.

The transmit beampattern 160 has a main lobe beamwidth that is substantially narrower than a beamwidth of any of the subarray beampatterns, as is expected.

Figure 4A:
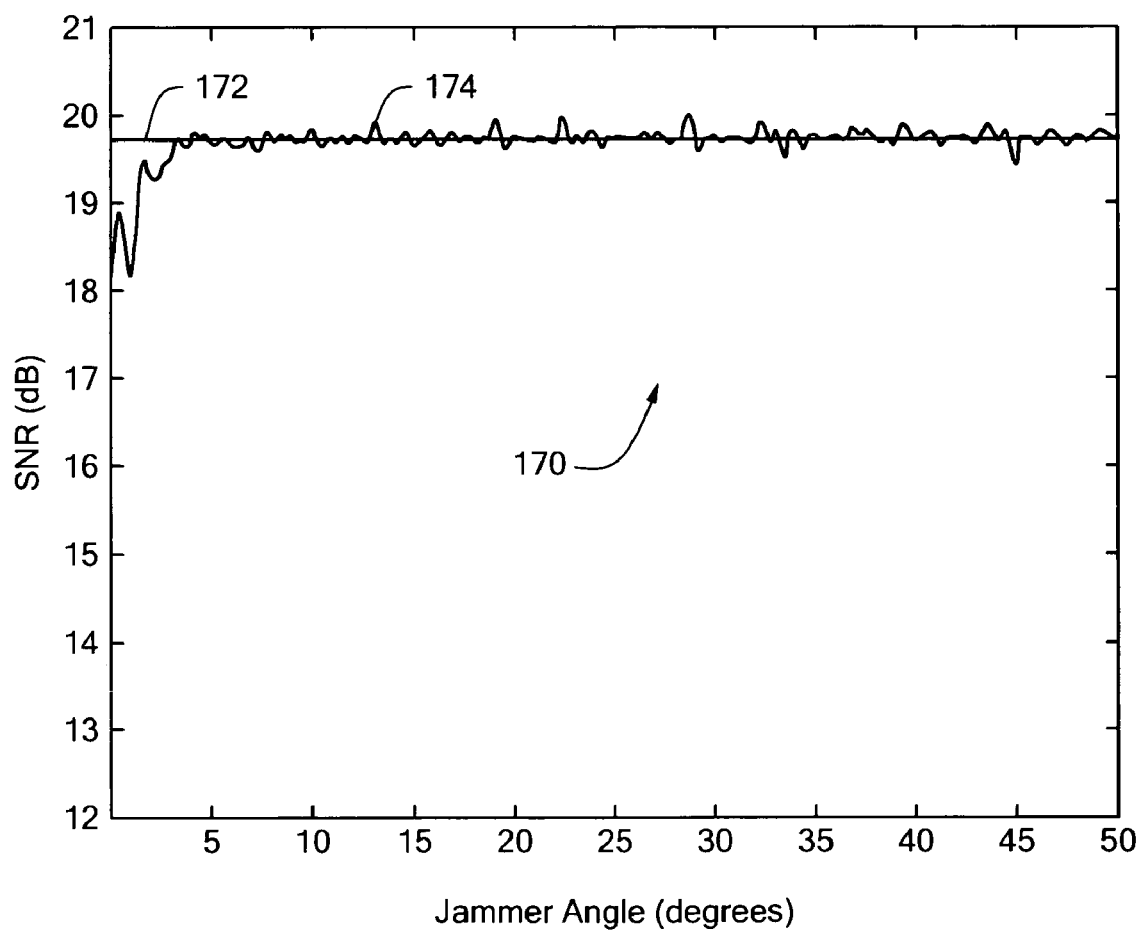
FIG. 4A is a graph of signal to noise ratio associated with an array geometry as in Case 1 of FIG. 3.

Referring now to FIG. 4A, a graph 170 includes a horizontal scale representing angle in units of degrees corresponding to an azimuth position of a jammer relative to a simulated radar array. A vertical scale representing signal to noise ratio in units of decibels corresponds to signal to noise ratio (SNR) of the simulated radar array when detecting a target. A curve 172 corresponds to a simulated signal to noise ratio achieved by the radar array identified as Case 1 in FIG. 3 in the presence of a target and no jammer. A curve 174 corresponds to a simulated signal to noise ratio achieved by the radar array identifed as Case 1 in FIG. 3 in the presence of both a target and a jammer. The radar array beam pattern is adaptively formed in receive mode, by applying appropriate complex adaptive weights when combining the subarray beampatterns of FIG. 3, to reduce the affect of the jammer as the jammer is simulated at different azimuth angles along the horizontal scale For each radar dwell, the target is located on the array boresight. As used herein, the term "dwell" refers to a pulse or series of pulses which are processed together, at one beam pointing direction, in order to receive information about a target—As used herein, the term "boresight" refers a direction perpendicular to the array face, which can also be defined as the direction where both azimuth and elevation of the main beam are zero. Thus, the signal to noise ratio provided by the array identified as Case 1 in FIG. 3 is substantially unaffected by the presence of a jammer.

For this simulation and simulations presented in conjunction with FIGS. 4A-4C, FIGS. 5A-5C, and 6A-6C, the jammer is characterized as a high power, wideband, barrage jammer. The target radar cross section (RCS), radar system noise figures, and radar system signal processing gain combine to yield the performances depicted in FIGS. 5-5C and 6-6C.

Referring now to FIG. 4B, a graph 190 includes a horizontal scale representing angle in units of degrees corresponding to an azimuth position of a jammer relative to a simulated radar array. A vertical scale representing azimuth angle to a target in units of azimuth beamwidth corresponds to detection information provided, for example, in the detection data 65a of FIG. 2.

A curve 192 shows simulated detection data azimuth angle associated with a boresight target in the presence of a jammer positioned at a variety of azimuth angles as described above in conjunction with FIG. 4A.

Referring now to FIG. 4C, a graph 194 includes a horizontal scale representing angle in units of degrees corresponding to an azimuth position of a jammer relative to a simulated radar array. A vertical scale representing elevation angle to a target in units of elevation beamwidth corresponds to detection information provided, for example, in the detection data 65a of FIG. 2.

A curve 196 shows simulated detection data elevation angle associated with a boresight target in the presence of a jammer positioned at a variety of azimuth angles as described above in conjunction with FIG. 4A.

It will be recognized that a boresight target, where there is no jammer present, should correspond to horizontal flat curves 192, 196 with some random noise having a variance associated with the radar system. It will be appreciated that the variance of the track data represented by the curves 192, 196 is relatively small, and is similar to a variance that would be achieved in the presence of no jammer.

Figure 5:
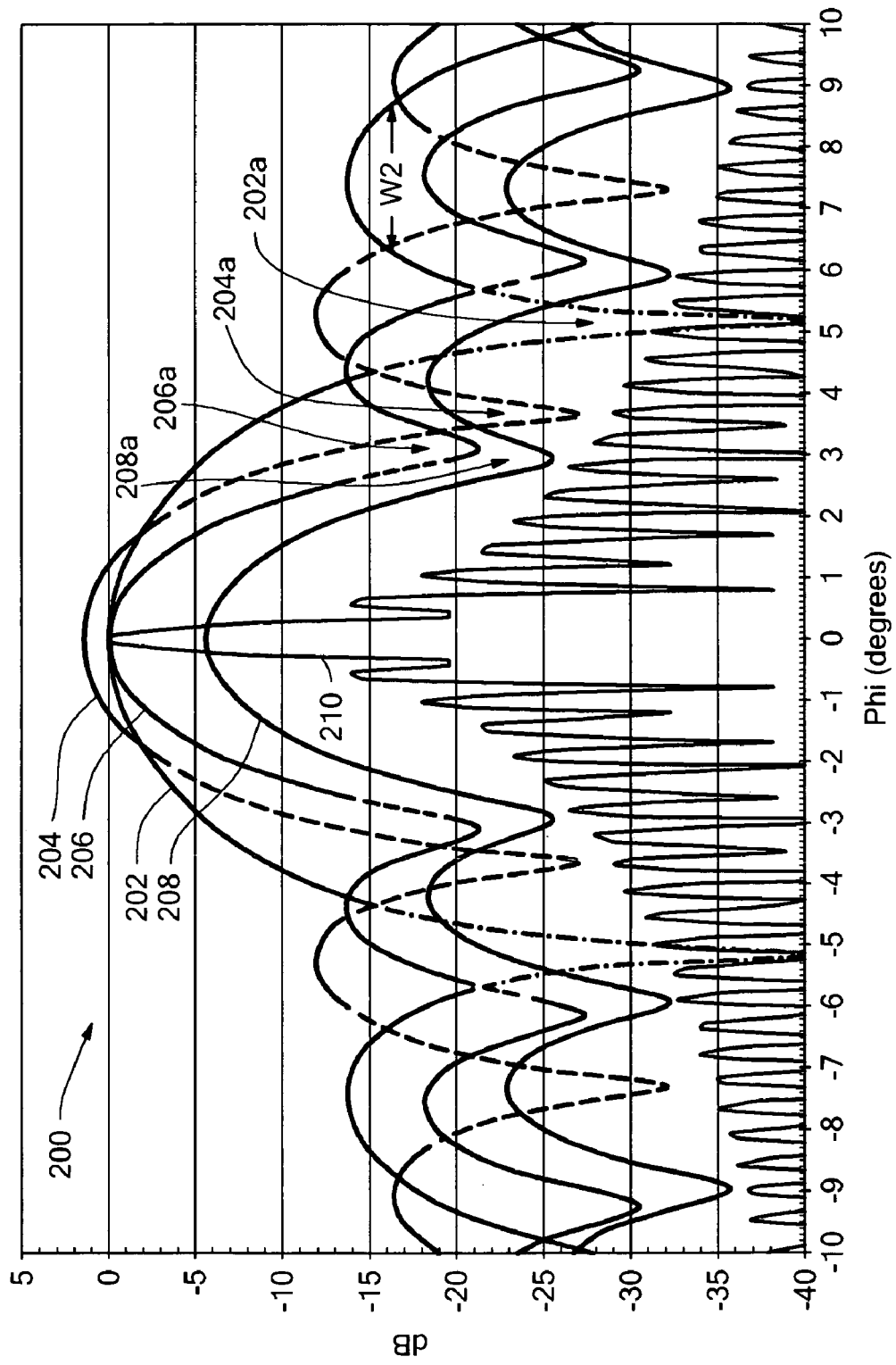
FIG. 5 is a graph showing beampatterns of subarrays corresponding to an array geometry as in Case 2 of FIG. 3.

Referring now to FIG. 5, a graph 200 includes a horizontal scale representing angle in units of degrees and a vertical scale representing power in units of decibels. Curves 202-208 correspond to azimuth subarray beampatterns of the radar array identified as Case 2 in FIG. 3 when used in a receive mode. A first curve 208 corresponds to simulated subarray beampatterns of each of the subarrays A, B, O, and P of FIG. 3, each having thirty-eight element columns corresponding to Case 2, when combined, for example, by one of the receive combiner circuits 20a-20N of FIG. 3. A second curve 206 corresponds to simulated subarray beampatterns of each of the subarrays C, D, M, and N of FIG. 3, each having thirty-seven element columns corresponding to Case 2. A third curve 204 corresponds to simulated subarray beampatterns of each of the subarrays E, F, K, and L of FIG. 3, each having thirty-one element columns corresponding to Case 2. A fourth curve 202 corresponds to simulated subarray beampatterns of each of the subarrays G, H, I, J of FIG. 3 having twenty-two element columns corresponding to Case 2. It will be understood that the curves 202-208 each correspond to four beampatterns, though only one is shown for clarity.

A linear Taylor illumination function, which would produce a −30 dB peak sidelobe level, was placed across the entire aperture in azimuth. The subarrays are normalized to the average number of elements in a subarray.

As described above, the receive beampatterns 202-208 are statically generated, for example by the receive combiner circuits 20a-20N (FIG. 2). The receive beampatterns 202-208 are combined, for example with the adaptive beamformer 64 of FIG. 2, using complex adaptive weights, to provide an adaptive receive beampattern (not shown).

A fifth curve 210 corresponds to a beampattern of the entire radar array identified as Case 2 in FIG. 3 when used in a transmit mode. As shown in FIG. 2, in the transmit mode, array elements are combined with the transmit combiner circuit 18 different than receive combiner circuits 20a-20N. In this case, all element of the radar array identified as Case 2 in FIG. 3 are uniformly combined and uniformly illuminated.

As in FIG. 4 above, it can be seen that beampattern nulls, for example beampattern nulls 202a-208a, corresponding to subarray beampatterns 202-208, respectively, occur at different angles and the different angles are relatively spaced by at least one quarter of a width of a sidelobe, for example, one quarter of a width $w_2$, of any of the subarray beampattern sidelobes.

The transmit beampattern 210 has a main lobe beamwidth that is substantially narrower than a beamwidth of any of the subarray beampatterns, as is expected and is the same as the transmit beampattern 160 of FIG. 4.

Figure 5A:
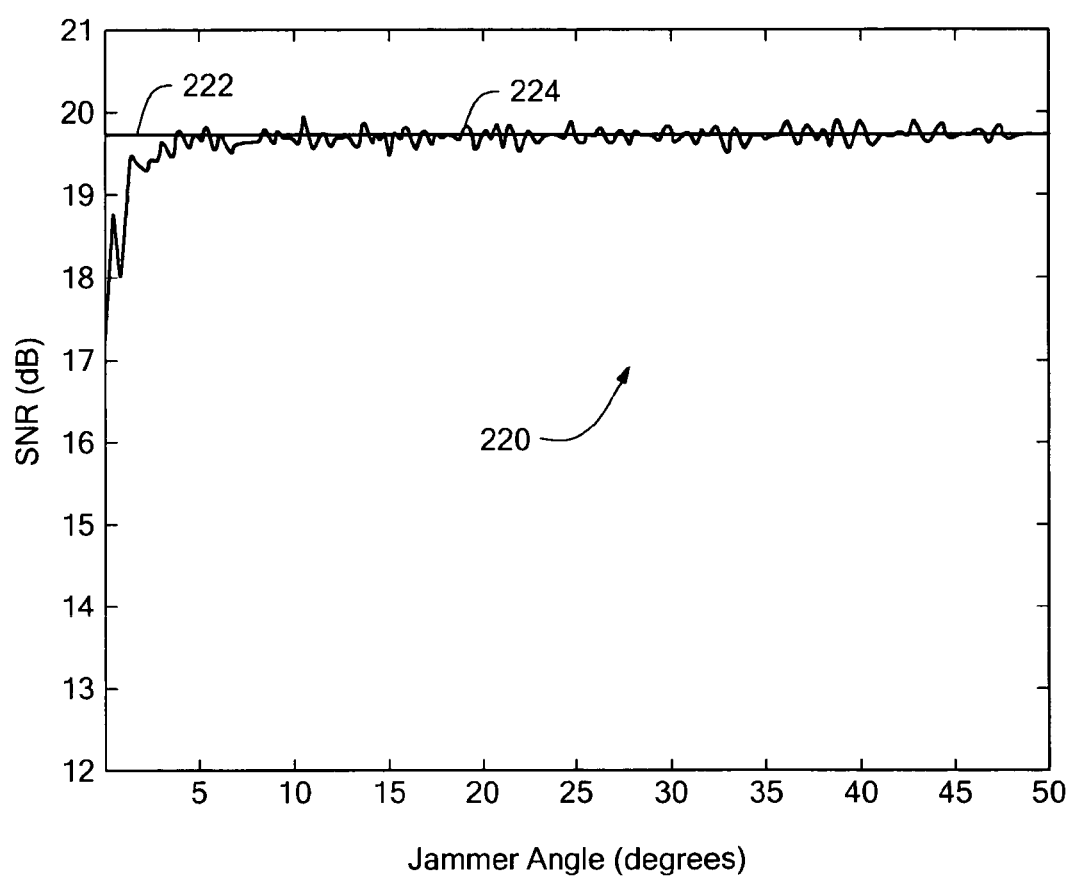
FIG. 5A is a graph of signal to noise ratio associated with an array geometry as in Case 2 of FIG. 3.

Referring now to FIG. 5A, a graph 220 includes a horizontal scale representing angle in units of degrees corresponding to an azimuth position of a jammer relative to a simulated radar array. A vertical scale representing signal to noise ratio in units of decibels corresponds to signal to noise ratio (SNR) of the simulated radar array when detecting a target. A curve 222 corresponds to a simulated signal to noise ratio achieved by the radar array identified as Case 2 in FIG. 3 in the presence of a target and no jammer. The curve 224 corresponds to a simulated signal to noise ratio achieved by the radar array identifed as Case 2 in FIG. 3 in the presence of both a target and a jammer. The radar array beam pattern is adaptively formed in the receive mode, by applying appropriate complex adaptive weights when combining the subarray beampatterns of FIG. 3, to reduce the affect of the jammer as the jammer is simulated at different azimuth angles along the horizontal scale. Thus, the signal to noise ratio provided by the array identified as Case 2 in FIG. 3 is substantially unaffected by the presence of a jammer.

Figure 5B:
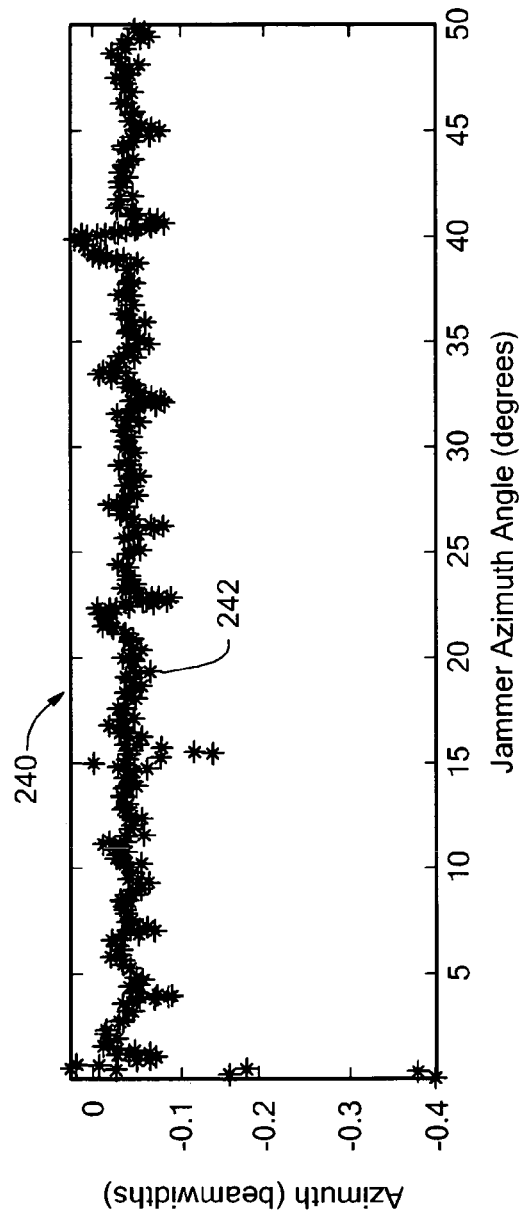
FIG. 5B is a graph of target angle error in azimuth associated with an array geometry as in Case 2 of FIG. 3.

Referring now to FIG. 5B, a graph 240 includes a horizontal scale representing angle in units of degrees corresponding to an azimuth position of a jammer relative to a simulated radar array. A vertical scale representing azimuth angle to a target in units of azimuth beamwidth corresponds to detection information provided, for example, in the detection data 65a of FIG. 2.

A curve 242 shows simulated detection data azimuth angle associated with a boresight target in the presence of a jammer positioned at a variety of jammer azimuth angles as described above in conjunction with FIG. 5A.

Figure 5C:
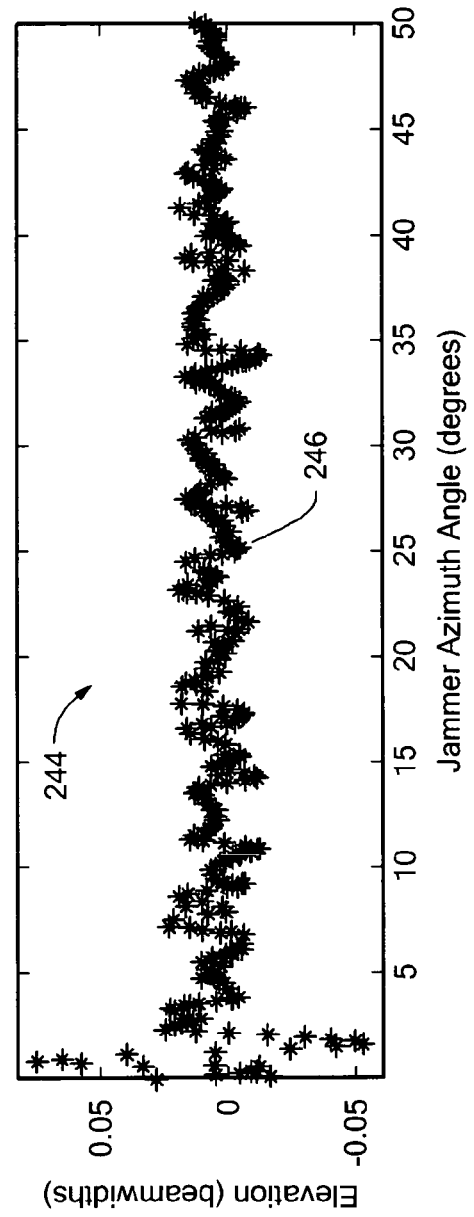
FIG. 5C is a graph of target angle error in elevation associated with an array geometry as in Case 2 of FIG. 3.

Referring now to FIG. 5C, a graph 244 includes a horizontal scale representing angle in units of degrees corresponding to an azimuth position of a jammer relative to a simulated radar array. A vertical scale representing elevation angle to a target in units of elevation beamwidth corresponds to detection information 65a provided, for example, in the track data 66 of FIG. 2.

A curve 246 shows simulated detection data elevation angle associated with a boresight target in the presence of a jammer positioned at a variety of jammer azimuth angles as described above in conjunction with FIG. 5A.

Again, it will be recognized that a boresight target with no jammer present should correspond to horizontal flat curves 242, 246 with some random noise having a variance associated with the radar system. It will be appreciated that the variance of the detection data represented by the curves 242, 246 is relatively small, and is similar to a variance that would be achieved in the presence of no jammer.

Figure 6:
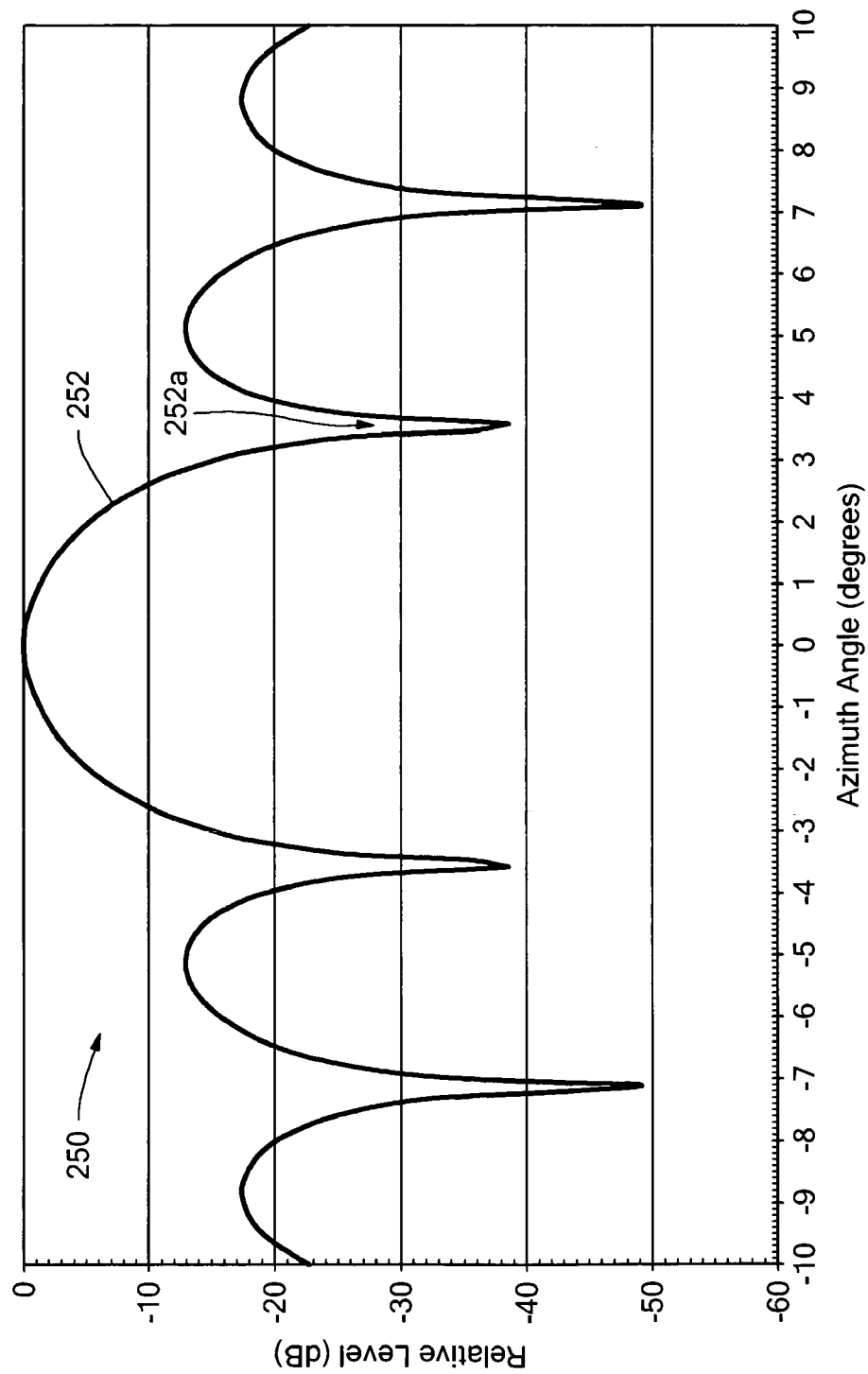
FIG. 6 is a graph showing beampatterns of subarrays corresponding to an array geometry as in Case 3 of FIG. 3.

Referring now to FIG. 6, a graph 250 includes a horizontal scale representing angle in units of degrees and a vertical scale representing power in units of decibels. Curve 252 corresponds to azimuth subarray beampatterns of the radar array identified as Case 3 in FIG. 3 when used in a receive mode. The curve 252 corresponds to simulated subarray beampatterns of each of the subarrays A-P of FIG. 3, each having thirty-two element columns corresponding to Case 3, when uniformly combined (i.e., uniformly illuminated), for example, by one of the receive combiner circuits 20a-20N of FIG. 3. It will be understood that the curve 252 corresponds to sixteen beampatterns, though only one is shown for clarity.

As described above, the receive beampatterns represented by the curve 252 are statically generated, for example by the receive combiner circuits 20a-20N (FIG. 2). The receive beampatterns 252 are combined, for example with the adaptive beamformer 64 of FIG. 2, using complex adaptive weights, to provide an adaptive receive beampattern (not shown). A transmit beampattern is not shown, but would be the same as the transmit beampatterns 160, 210 of FIGS. 4 and 5, respectively.

Figure 6A:
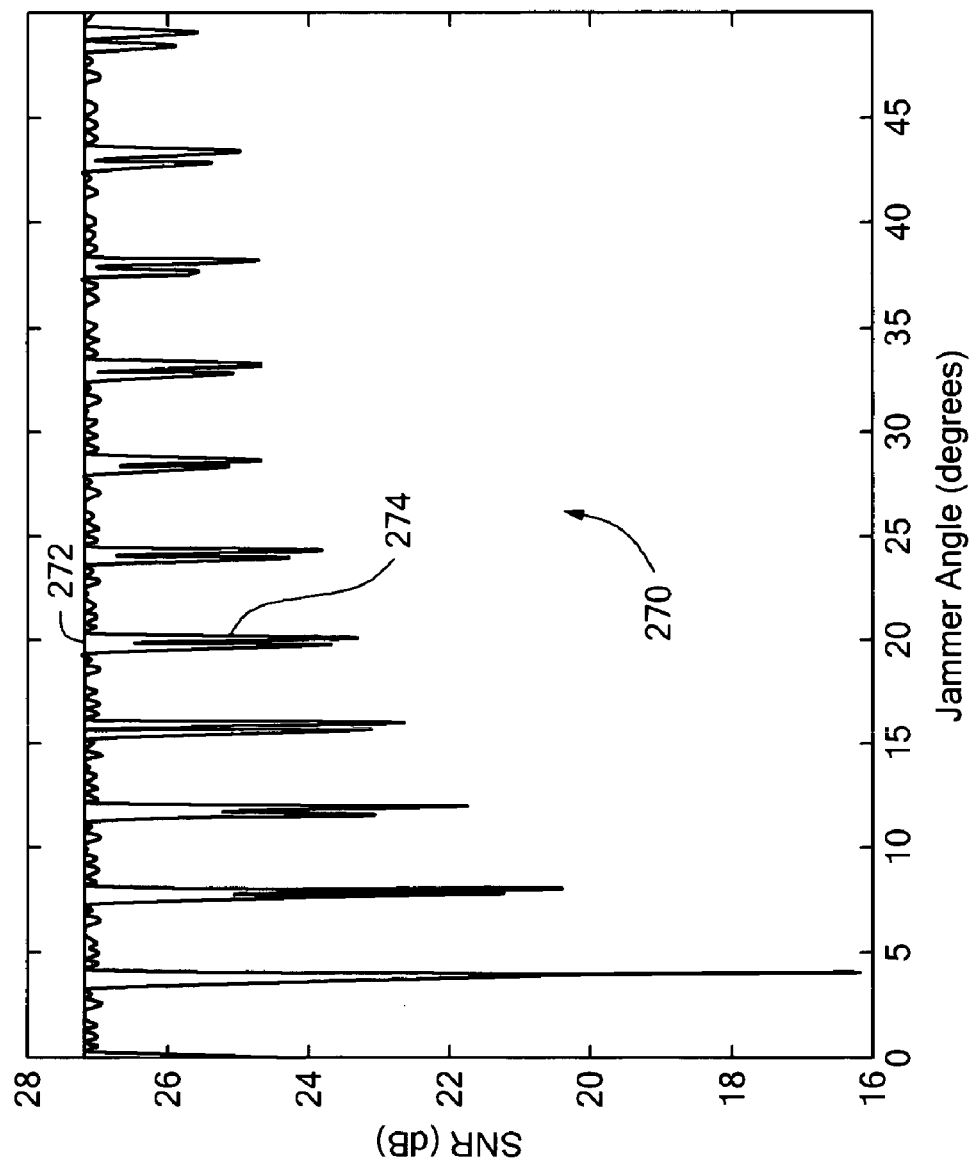
FIG. 6A is a graph of signal to noise ratio associated with an array geometry as in Case 3 of FIG. 3.

Referring now to FIG. 6A, a graph 270 includes a horizontal scale representing angle in units of degrees corresponding to an azimuth position of a jammer relative to a simulated radar array. A vertical scale representing signal to noise ratio in units of decibels corresponds to signal to noise ratio (SNR) of the simulated radar array when detecting a target. A curve 272 corresponds to a simulated signal to noise ratio achieved by the radar array identified as Case 3 in FIG. 3 in the presence of a target and no jammer. A curve 274 corresponds to a simulated signal to noise ratio achieved by the radar array identifed as Case 3 in FIG. 3 in the presence of both a target and a jammer. The radar array beam pattern is adaptively formed in the receive mode, by applying appropriate complex adaptive weights when combining the subarray beampatterns of FIG. 3, to reduce the affect of the jammer as the jammer is simulated at different azimuth angles along the horizontal scale. The curve 274 can be compared with curves 174, 224 of FIGS. 4A and 5A, respectively, which are indicative of a simulated signal to noise ratio achieved in the presence of no jammer. The signal to noise ratio provide by the array identified as Case 3 in FIG. 3 is greatly affected by the presence of a jammer. It should be noted that in FIG. 6A, the radar cross section (RCS) of the target was increased relative to the RCS of the target in FIGS. 4A and 5A in order to get target detections for all jammer locations; therefore, the absolute signal-to-noise is not comparable in the cases. The comparison can only be made within the same case, as in one of the figures, with and without the jammer being present.

Figure 6B:
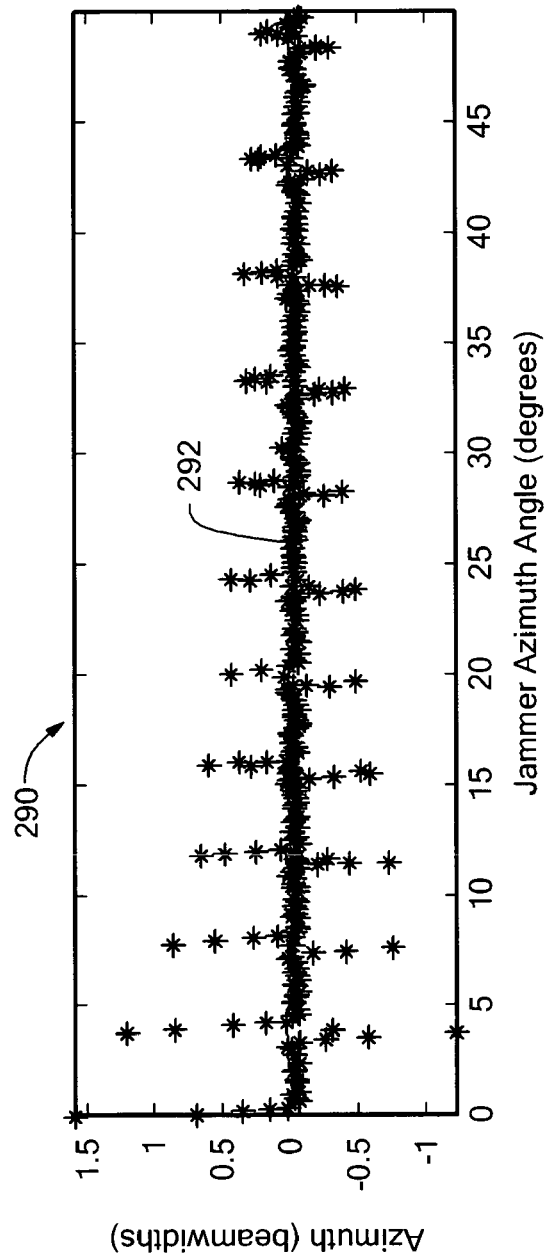
FIG. 6B is a graph of target angle error in azimuth associated with an array geometry as in Case 3 of FIG. 3.

Referring now to FIG. 6B, a graph 290 includes a horizontal scale representing angle in units of degrees corresponding to an azimuth position of a jammer relative to a simulated radar array. A vertical scale representing azimuth angle to a target in units of azimuth beamwidth corresponds to detection information provided, for example, in the detection data 65a of FIG. 2.

A curve 292 shows simulated detection data azimuth angle associated with a boresight target in the presence of a jammer positioned at a variety of jammer azimuth angles as described above in conjunction with FIGS. 4A and 5A.

Figure 6C:
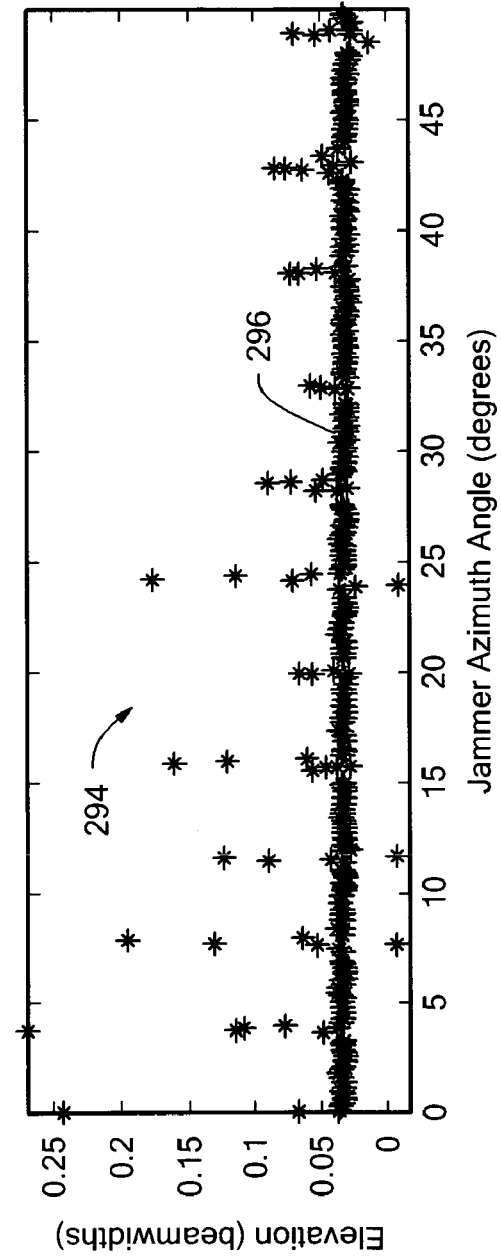
FIG. 6C is a graph of target angle error in elevation associated with an array geometry as in Case 3 of FIG. 3.

Referring now to FIG. 6C, a graph 294 includes a horizontal scale representing angle in units of degrees corresponding to an azimuth position of a jammer relative to a simulated radar array. A vertical scale representing elevation angle to a target in units of elevation beamwidth corresponds to detection information provided, for example, in the detection data 65a of FIG. 2.

A curve 292 shows simulated detection data elevation angle associated with a boresight target in the presence of a jammer positioned at a variety of jammer azimuth angles as described above in conjunction with FIGS. 4A and 5A.

Again, it will be recognized that a boresight target with no jammer present should correspond to horizontal flat curves, with some random noise having a variance associated with the radar system. It will be appreciated that the variance of the detection data represented by the curves 292, 296 is larger than a variance that would be achieved in the presence of no jammer. Also, comparing the curves 292, 296 with the curves 192, 196 of FIGS. 4B and 4C and the curves 242, 246 of FIGS. 5B and 5C, the radar array of Case 3 identified in FIG. 3 has more detection data variance that the radar array identified as Cases 1 and 2.

The radar array identified as Case 3 is described herein merely to give a comparison. As described above, the radar array identified as Case 3 does not include phase center positions that are non-uniformly spaced from each other along at least one principal dimension and does not include the number of element columns and/or number of element rows which are relatively prime.

All references cited herein are hereby incorporated by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An adaptive antenna array, comprising:
a plurality of subarrays, each one of the plurality of subarrays comprised of elements, wherein the elements of the plurality of subarrays are arranged in element rows and element columns, wherein the plurality of subarrays are arranged in subarray rows and subarray columns, wherein at least one of: ones of the subarray rows have a different number of element rows than other ones of the subarray rows or ones of the subarray columns have a different number of element columns than other ones of the subarray columns, wherein each of the plurality of subarrays has a respective phase center forming a plurality of phase centers at different phase center positions substantially on a plane, wherein the different phase center positions are non-uniformly spaced from each other along at least one principal dimension in the plane, resulting in each phase center that has two adjacent phase centers along the at least one principal dimension being spaced by different amounts from the two adjacent phase centers.

2. The adaptive antenna array of claim 1, wherein each of the subarrays is a rectangular subarray.

3. The adaptive antenna array of claim 1, wherein the each of the subarrays has a respective shape selected in accordance with an elliptical array aperture.

4. The adaptive antenna array of claim 1, wherein the ones of the subarray rows have a different number of element rows than the other ones of the subarray rows and the ones of the subarray columns have a different number of element columns than the other ones of the subarray columns.

5. The adaptive antenna array of claim 1, wherein the phase center positions are on a partially populated grid or on a sparsely populated grid.

6. The adaptive antenna array of claim 1, wherein the different phase center positions are non-uniformly spaced from each other along two principal perpendicular dimensions in the plane.

7. The adaptive antenna array of claim 1, wherein, for all of the plurality of subarrays, each one of the plurality of subarrays in a respective subarray column has the same number of element columns and each one of the plurality of subarrays in a respective subarray row has the same number of element rows.

8. The adaptive antenna array of claim 1, wherein each one of the plurality of subarrays has a planar boundary not overlapping a planar boundary of another one of the plurality of subarrays.

9. The adaptive array of claim 1, wherein the adaptive array is an adaptive radar antenna array.

10. The adaptive array of claim 1, wherein each of the subarray columns has a number of element columns in a range of about twenty to forty.

11. The adaptive antenna array of claim 1, wherein each of the subarray rows has a number of element rows in a range of about twenty to forty.

12. The adaptive array of claim 1, wherein a total number of subarray rows is in a range of about two to twenty.

13. The adaptive array of claim 1, wherein a total number of subarray columns is in a range of about two to twenty.

14. The adaptive array of claim 1, wherein at least two of the plurality of subarrays, when adapted, form null locations at different angles.

15. The adaptive array of claim 14, wherein the different angles differ by at least one quarter of a width of a sidelobe associated with one of the at least two subarrays.

16. The adaptive antenna array of claim 1, wherein numbers of element columns in at least half of the subarrays in a subarray row are relatively prime.

17. The adaptive antenna array of claim 1, wherein numbers of element rows in at least half of the subarrays in a subarray column are relatively prime.

18. The adaptive antenna array of claim 1, wherein the plurality of subarrays are symmetrical about at least one principal axis in the plane.

19. The adaptive antenna array of claim 1, wherein the plurality of subarrays are symmetrical about two perpendicular principal axes in the plane.

20. A radar system, comprising:
an adaptive array having a plurality of subarrays, each one of the plurality of subarrays comprised of elements, wherein the elements of the plurality of subarrays are arranged in element rows and element columns, wherein the plurality of subarrays are arranged in subarray rows and subarray columns, wherein at least one of: ones of the subarray rows have a different number of element rows than other ones of the subarray rows or ones of the subarray columns have a different number of element columns than other ones of the subarray columns, wherein each of the plurality of subarrays has a respective phase center forming a plurality of phase centers at different phase center positions substantially on a plane, wherein the different phase center positions are non-uniformly spaced from each other along at least one principal dimension in the plane, resulting in each phase center that has two adjacent phase centers along the at least one principal dimension being spaced by different amounts from the two adjacent phase centers.

21. The radar system of claim 20, wherein each of the subarrays is a rectangular subarray.

22. The adaptive radar system of claim 20, wherein the each of the subarrays has a respective shape selected in accordance with an elliptical array aperture.

23. The radar system of claim 20, wherein the different phase center positions are non-uniformly spaced from each other along two principal perpendicular dimensions in the plane.

24. The radar system of claim 20, wherein, for all of the plurality of subarrays, each one of the plurality of subarrays in a respective subarray column has the same number of element columns and each one of the plurality of subarrays in a respective subarray row has the same number of element rows.

25. The radar system of claim 20, wherein numbers of element columns in at least half of the subarrays in a subarray row are relatively prime.

26. The radar system of claim 20, wherein numbers of element rows in at least half of the subarrays in a subarray column are relatively prime.

27. A method of adapting a radar array, comprising:
generating complex adaptive weights associated with the radar array in accordance with a position of one or more jammers and also in accordance with a plurality of subarrays within the radar array, each one of the plurality of subarrays comprised of elements, wherein the elements of the plurality of subarrays are arranged in element rows and element columns, wherein the plurality of subarrays are arranged in subarray rows and subarray columns, wherein at least one of: ones of the subarray rows have a different number of element rows than other ones of the subarray rows and ones of the subarray columns have a different number of element columns than other ones of the subarray columns, wherein each of the plurality of subarrays has a respective phase center forming a plurality of phase centers at different phase center positions substantially on a plane, wherein the different phase center positions are non-uniformly spaced from each other along at least one principal dimension in the plane, resulting in each phase center that has two adjacent phase centers along the at least one principal dimension being spaced by different amounts from the two adjacent phase centers; and applying the complex adaptive weights to the radar array.

28. The method of claim 27, wherein each of the subarrays is a rectangular subarray.

29. The method of claim 27, wherein the each of the subarrays has a respective shape selected in accordance with an elliptical array aperture.

30. The method of claim 27, wherein the different phase center positions are non-uniformly spaced from each other along two principal perpendicular dimensions in the plane.

31. The method of claim 27, wherein, for all of the plurality of subarrays, each one of the plurality of subarrays in a respective subarray column has the same number of element columns and each one of the plurality of subarrays in a respective subarray row has the same number of element rows.

32. The method of claim 27, wherein numbers of element columns in at least half of the subarrays in a subarray row are relatively prime.

33. The method of claim 27, wherein numbers of element rows in at least half of the subarrays in a subarray column are relatively prime.

* * * * *

UNITED STATES PATENT AND TRADEMARK OFFICE
CERTIFICATE OF CORRECTION

PATENT NO.          : 7,317,427 B2
APPLICATION NO.     : 11/042878
DATED               : January 8, 2008
INVENTOR(S)         : Barbara E. Pauplis et al.

It is certified that error appears in the above-identified patent and that said Letters Patent is hereby corrected as shown below:

Column 3, line 16 delete "aspect the" and replace with --aspect of the--

Column 3, line 21 delete "an" and replace with --and--

Column 3, line 29 delete "an" and replace with --and--

Column 6, line 8 delete "embodiment" and replace with --embodiment,--

Column 6, line 12 delete "is in" and replace with --in--

Column 6, line 34 delete "embodiments" and replace with --embodiments,--

Column 6, line 46 delete "embodiment," and replace with --embodiments,--

Column 7, line 25 delete "correspond" and replace with --corresponds--

Column 8, line 29 delete "target-" and replace with --target.--

Column 8, line 30 delete "refers a" and replace with --refers to a--

Column 8, line 37 delete "and 6A-6C," and replace with --and FIGS. 6A-6C,--

Column 8, line 41-42 delete "and 6-6C." and replace with --and FIGS. 6A-6C.--

Column 9, line 42 delete "element" and replace with --elements--

UNITED STATES PATENT AND TRADEMARK OFFICE
CERTIFICATE OF CORRECTION

| | | |
|---|---|---|
| PATENT NO. | : 7,317,427 B2 | |
| APPLICATION NO. | : 11/042878 | |
| DATED | : January 8, 2008 | |
| INVENTOR(S) | : Barbara E. Pauplis et al. | |

It is certified that error appears in the above-identified patent and that said Letters Patent is hereby corrected as shown below:

Column 11, line 13 delete "provide" and replace with --provided--

Signed and Sealed this

Twenty-first Day of October, 2008

JON W. DUDAS
*Director of the United States Patent and Trademark Office*